(12) United States Patent
Zhang et al.

(10) Patent No.: US 8,086,978 B2
(45) Date of Patent: Dec. 27, 2011

(54) METHOD AND SYSTEM FOR PERFORMING STATISTICAL LEAKAGE CHARACTERIZATION, ANALYSIS, AND MODELING

(75) Inventors: Lizheng Zhang, San Jose, CA (US);
Parveen Khurana, Delhi (IN); Vassilios Gerousis, San Jose, CA (US);
Hongliang Chang, Cupertino, CA (US);
Sachin Shrivastava, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 314 days.

(21) Appl. No.: 12/143,547

(22) Filed: Jun. 20, 2008

(65) Prior Publication Data
US 2009/0319969 A1 Dec. 24, 2009

(51) Int. Cl.
*G06F 17/50* (2006.01)
(52) U.S. Cl. .................................................. 716/109
(58) Field of Classification Search ............ 716/5, 109
See application file for complete search history.

(56) References Cited

U.S. PATENT DOCUMENTS

| | | | |
|---|---|---|---|
| 6,449,753 B1 | 9/2002 | Aingaran et al. | |
| 6,499,131 B1 | 12/2002 | Savithri et al. | |
| 6,940,293 B2 | 9/2005 | Ramarao et al. | |
| 7,137,080 B2 * | 11/2006 | Acar et al. | 716/2 |
| 7,363,605 B1 | 4/2008 | Kondratyev et al. | |
| 7,458,041 B2 * | 11/2008 | Hershenson et al. | 716/2 |
| 7,650,580 B2 | 1/2010 | Kucukcakar et al. | |
| 7,673,260 B2 * | 3/2010 | Chen et al. | 716/4 |
| 7,739,098 B2 | 6/2010 | Kucukcakar et al. | |
| 7,793,239 B2 * | 9/2010 | Engel et al. | 716/4 |
| 7,801,718 B2 | 9/2010 | Reddy et al. | |
| 2005/0172250 A1 | 8/2005 | Kucukcakar et al. | |
| 2006/0015834 A1 | 1/2006 | Amekawa | |
| 2006/0112359 A1 | 5/2006 | Becer et al. | |
| 2008/0046848 A1 | 2/2008 | Tetelbaum et al. | |
| 2010/0083198 A1 * | 4/2010 | Zhang et al. | 716/4 |

OTHER PUBLICATIONS

T. Li, et al. Statistical Analysis of Full-Chip Leakage Power Considering Junction Tunneling Leakage. DAC 2007, pp. 99-102.
H. F. Dadgour, et al. Statistical Framework for Estimation of Full-Chip Leakage-Power Distribution Under Parameter Variations. IEEE Transactions on Electron Devices, Nov. 2007, vol. 52, Issue 11, pp. 2930-2945.
X. Li, et al. Projection-based statistical analysis of full-chip leakage power with non-log-normal distributions. Proceedings of the 43rd annual conference on Design automation, San Francisco, California, pp. 103-108 Jul. 2006.
A. Srivastava, et al. Accurate and efficient gate-level parametric yield estimation considering correlated variations in leakage power and performance. In Proceedings of Design Automation Conference. Anaheim, California, pp. 535-540, 2005.
H. Chang, et al. Full-chip analysis of leakage power under process variations, including spatial correlations. In Proceedings of the ACM/IEEE Design Automation Conference. Anaheim, California, pp. 523-528, 2005.

(Continued)

*Primary Examiner* — Vuthe Siek
*Assistant Examiner* — Brandon Bowers
(74) *Attorney, Agent, or Firm* — Vista IP Law Group, LLP (57) ABSTRACT

A method, system, and computer program product are disclosed for performing statistical leakage power characterization to estimate yield of a circuit in terms of leakage power. According to some approaches, this is performed with consideration of state correlation.

36 Claims, 6 Drawing Sheets

OTHER PUBLICATIONS

A. Srivastava, et al. Modeling and analysis of leakage power considering within-die process variations. In Proceedings of the International Symposium on Low Power Electronics and Design. Monterey, California, pp. 64-67, 2005.

R. Rao, et al. Parametric yield estimation considering leakage variability. In Proceedings of Design Automation Conderence. San Diego, California, pp. 442-447, 2004.

S. Narendra, et al. Full-chip sub-threshold leakage power prediction model for sub-0.18μm CMOS. In Proceedings of the International Symposium on Low Power Electronics and Design. Monterey, California, pp. 19-23, 2002.

S. Mukhopadhyay, et al.. Modeling and estimation of total leakage current in nano-scaled CMOS devices considering the effect of parameter variation. International Symposium on Low Power Electronics and Design. Seoul, Korea, pp. 172-175, 2003.

Non-Final Office Action dated Mar. 8, 2011 for U.S. Appl. No. 12/241,519.

Non-Final Office Action dated Apr. 26, 2011 for U.S. Appl. No. 12/241,278.

Notice of Allowance dated Jul. 22, 2011 for U.S. Appl. No. 12/241,519.

Notice of Allowance dated Aug. 29, 2011 for U.S. Appl. No. 12/241,278.

* cited by examiner

METHOD AND SYSTEM FOR PERFORMING STATISTICAL LEAKAGE CHARACTERIZATION, ANALYSIS, AND MODELING

BACKGROUND AND SUMMARY

The invention is directed to an improved approach for designing, analyzing, and manufacturing integrated circuits.

An integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. After an integrated circuit designer has created the physical design of the circuit, the integrated circuit designer then verifies and optimizes the design using a set of EDA testing and analysis tools.

Based upon the layout, photomasks are created for lithographic manufacturing of the electronic product. A photomask, or more simply a "mask," provides the master image of one layer of a given integrated chip's physical geometries. A typical photolithography system projects UV light energy on to and through the mask in order to transmit the mask pattern in reduced size to the wafer surface, where it interacts with a photosensitive coating on the wafer. Other processes may also be performed during to manufacture an integrated circuit. For example, etching, electroplated copper deposition (ECD), and chemical mechanical polishing (CMP) may be used to form interconnects for the IC.

Significant variations may arise during the process of manufacturing the IC. These variations are commonly caused by side-effects of the processing used to manufacture the IC. For example, optical effects of using lithographic manufacturing process may cause variations to exist in the manufactured device from the originally intended feature dimensions and geometries of the layout. Variations in feature density, widths, and heights may also occur during the CMP, etching, and plating processes.

With shrinking process node sizes, the inherent effect of process variations is playing a larger factor in defining the behavior of a circuit. In particular, the variations may lead to serious problems and flaws in the manufactured IC. This leads to serious risks of reduced manufacturing yield and increased failures for final products that incorporate the IC devices.

One particular area of concern is with regard to the management of leakage power in an IC product. As processing technology sizes shrink, the effects of process variations becomes quite significant towards its effects upon leakage power. Pattern-based effects within the manufactured IC devices may cause leakage currents in transistors to exceed allowable levels, which cause excessive amounts of leakage power to affect the performance and viability of the IC device.

One possible approach to managing leakage power with respect to process variations is for the IC manufacturing or fabrication facility to provide static maximum and minimum worst-case corner values that are used to analyze the circuit design. One problem with this approach is that the fabrication facility, commonly referred to as either the "fab" or "foundry", is typically overly pessimistic with respect to the provided max and min values. Another problem is that as newer designs utilize smaller and smaller feature sizes, the range between the max and min values has become overly large relative to the designed feature sizes.

Therefore, it is clear that there is a need for an improved approach to perform leakage power analysis, characterization, and management. According to some embodiments of the invention, statistical leakage power analysis and characterization is employed as a method for estimating yield of a circuit in terms of leakage power. The present invention provides a method, system, and computer program product for performing statistical leakage power analysis/characterization with consideration of state correlation.

Other and additional objects, features, and advantages of the invention are described in the detailed description, figures, and claims.

DETAILED DESCRIPTION

The present invention provides a method, system, and computer program product for performing statistical leakage power analysis with consideration of state correlation. As used herein, the meaning of the terms "analysis" or "analyze" include characterization. As noted above, with shrinking process node sizes, the inherent effect of process variations is playing a larger factor in defining the behavior of a circuit. The present invention provides an improved approach for a method for estimating yield of a circuit in terms of leakage power. The accuracy of statistical leakage power analysis/ characterization is improved by promoting the accuracy and availability of the required statistical leakage information, e.g., leakage library model in a statistical leakage library.

According to some embodiments of the invention, accurate and usable leakage library models are generated that encapsulate the effects of process variations on leakage power. As used herein, the term "model" refers to a set of data that identifies one or more specific characteristics within an IC design, layout, and/or data relating to its effect, manufacturability, and/or usability.

Numerous types of process variations may result from the IC manufacturing process. The following are four possible categories for the process variations:

1. "Global" variations—This category of variations corresponds to die-to-die process variations. Here, it is assumed that the process variations are identical across the die. This is often used for fully correlated variations.
2. "Local" variations—This category corresponds to within-the-die process variations. Here, the process parameters are assumed to vary across the die with some correlation, which is typically defined in terms of distance between cell instances.
3. "Random" Variations—These variations, as is evident from the name, factor in the effect of random and uncorrelated variations in the various elements of the circuit.
4. "Environmental"—This category of process variations correspond to, for example, temperature and voltage variations.

Figure 1:
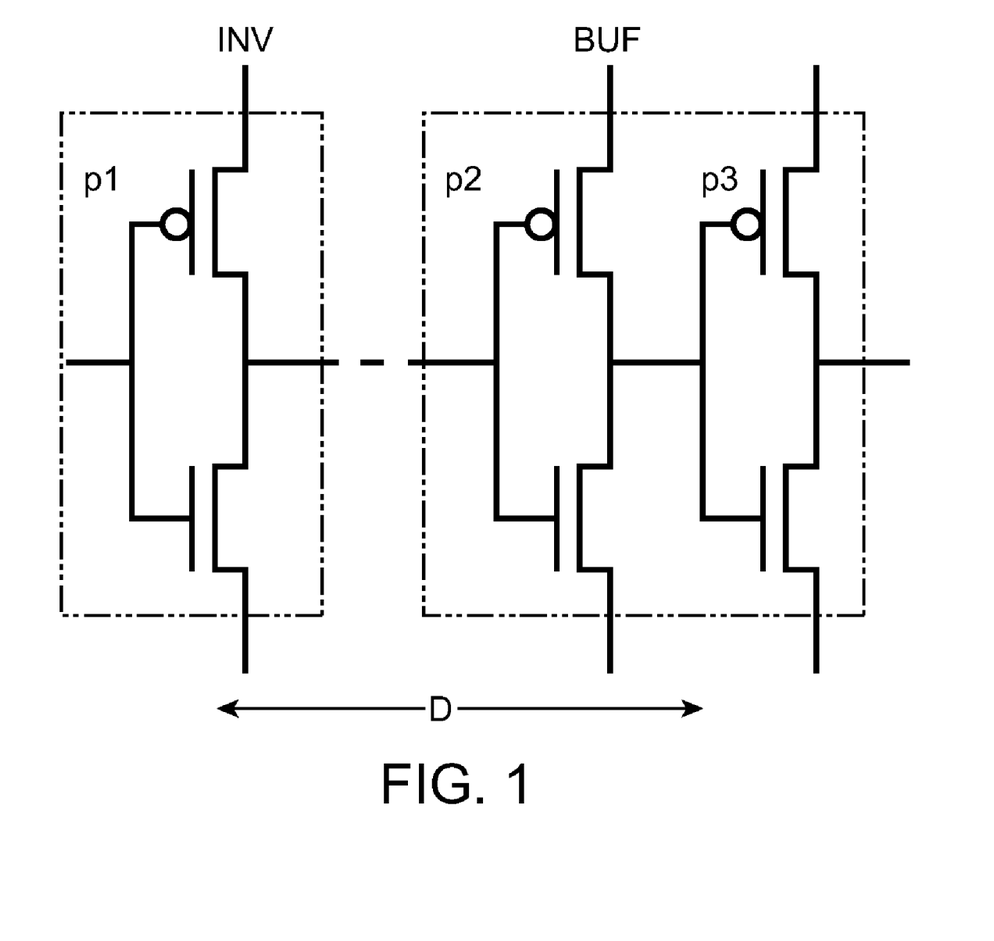
FIG. 1 is used to illustrate different categories of process variations.

These different categories of variations and their possible correlation types will now be illustrated with reference to FIG. 1. Assume that the variation modeling is characterized by the following:

$$P = P_{nom} + P_{global} + P_{sys} + P_{random}$$

where "P" refers to the process parameter random variable (e.g., Tox, Length, and Width). $P_{nom}$ is the nominal value. $P_{global}$ corresponds to off-chip global variations, with perfect correlation between devices: Correlation(p1,p2)=Correlation(p1,p3)=Correlation(p2,p3)=1. $P_{sys}$ corresponds to on-chip Systematic Variations, with correlation as a function of distance: Correlation(p2,p3)=1; Correlation(p1,p2)=Correlation(p1,p3)=f(D). $P_{random}$ corresponds to on-chip random variations, with no correlation between devices: Correlation(p1,p2)=Correlation(p1,p3)=Correlation(p2,p3)=0.

By their very nature the random variations are the hardest to compute. This is because there is a need to factor in the effect of the devices within the standard cell varying independently of each other. However, for within-die variations, it is quite possible that the state and characteristics of devices for a first state to be different from a second state. The differences between the multiple states could affect leakage, and as a result, should be considered when performing leakage power analysis/characterization. The issue is further complicated by process variations that occur to features within the design.

The present invention provides a novel and accurate approach for addressing such variations and for performing model correlation for the different states of the design. In particular, embodiments of the invention consider state correlation when performing statistical leakage power analysis/characterization.

Figure 2:
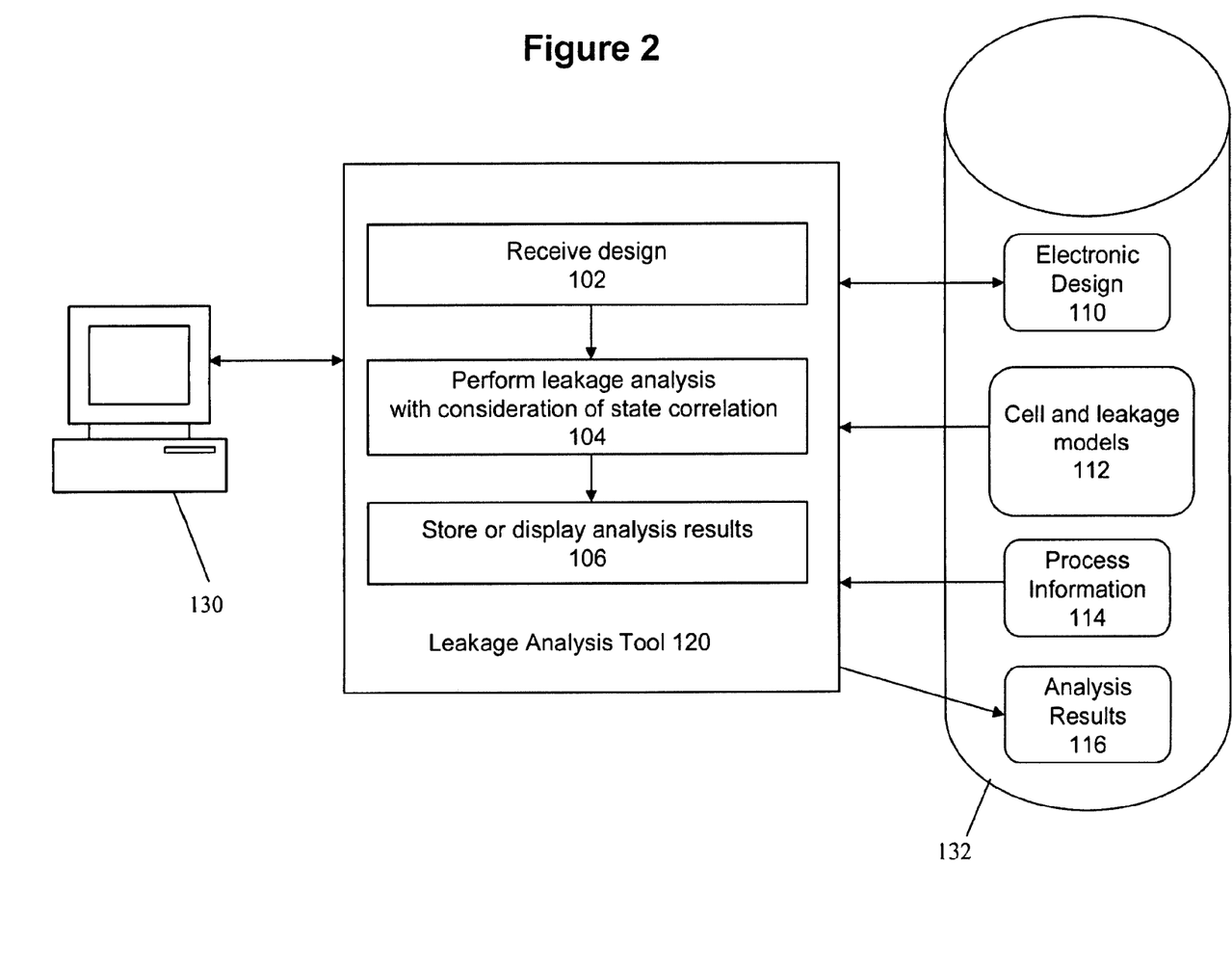
FIG. 2 shows an architecture of a system for performing leakage power analysis/characterization according to some embodiments of the invention.

FIG. 2 illustrates a high level architectural diagram of an example system with which the invention may be implemented. A user at a user station 130 utilizes an electronic design/analysis tool, e.g., a leakage analysis design tool 120, to analyze, characterize, optimize, and manage leakage power for an electronic design 110. The electronic design 110 may be stored in an electronic database 132. Process information 114 from the foundry may also be stored within the database 132.

The database 132 may also include a statistical leakage library having cell models 112. These cell models 112 are generated by characterization of the cell behavior in various conditions. Existing cell models for leakage can be enhanced to represent the effect of process variations on leakage, and can be capable of representing correlation of leakage power between various states. In a particular embodiment, these models represent the effect of process variations on leakage in terms of sensitivities. For example, the sensitivity of the log of the leakage to process parameter variations could be used to represent these sensitivity values. The analysis tools would use these sensitivity numbers to compute the effect of process variations on the overall design.

In operation, the leakage analysis tool 120 receives the electronic design 110 and process information 114 to perform an analysis of the leakage power situation (102). In some embodiments of the invention, leakage analysis/characterization is performed with consideration of state correlation for portions or cells of the design, as described in more detail below (104). Based upon the results of the leakage power analysis/characterization, the results 116 can be either, or both, stored within a computer readable medium at the database 132 or displayed at a display device at user station 130.

Figure 3:
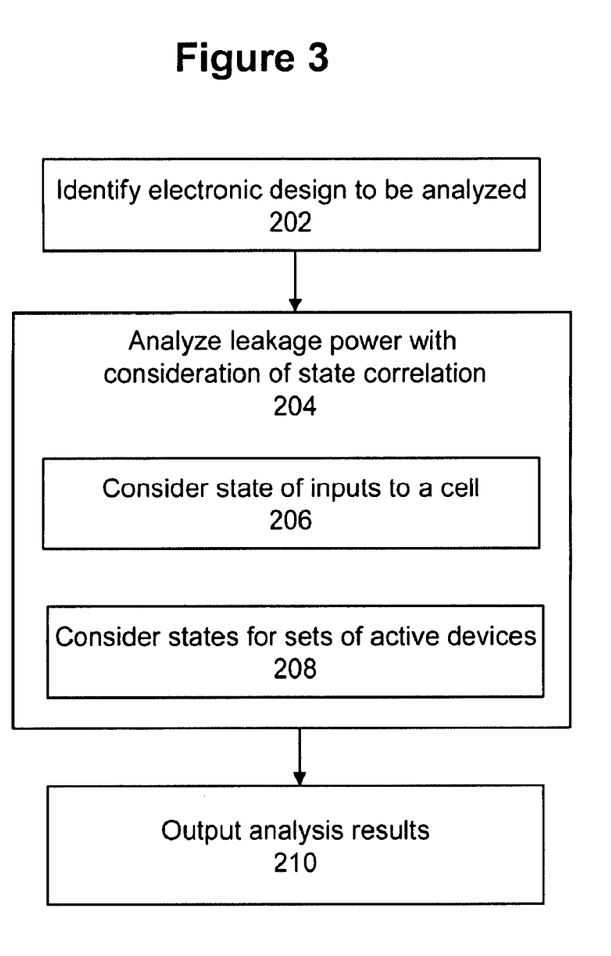
FIG. 3 illustrates a flowchart of a process for performing leakage power analysis/characterization with consideration of state correlation according to some embodiments of the invention.

FIG. 3 shows a high-level flow of a process for performing leakage power analysis/characterization with consideration of state correlation according to some embodiments of the invention. At 202, the process begins by identifying the electronic design to be analyzed. Any suitable type of electronic design can be analyzed and at different levels of design abstraction.

At 204, the process performs an analysis/characterization of leakage power for the electronic design with state correlation. This allows the analysis tool to factor in the effect of the devices within the standard cell varying independently of each other, while still providing some correlation. Accordingly, at 206, the process analyzes the state of primary inputs of a cell that affect its leakage power. In addition, at 208, the process considers and takes into account the fact that the same set of active devices (e.g., transistors) can be active for different states. Each of these actions is described in more detail below.

Once the analysis has been completed, the analysis results are outputted for the user at 210. This occurs by either storing the analysis results in a computer readable medium or displaying the analysis results on a display device.

Figure 4:
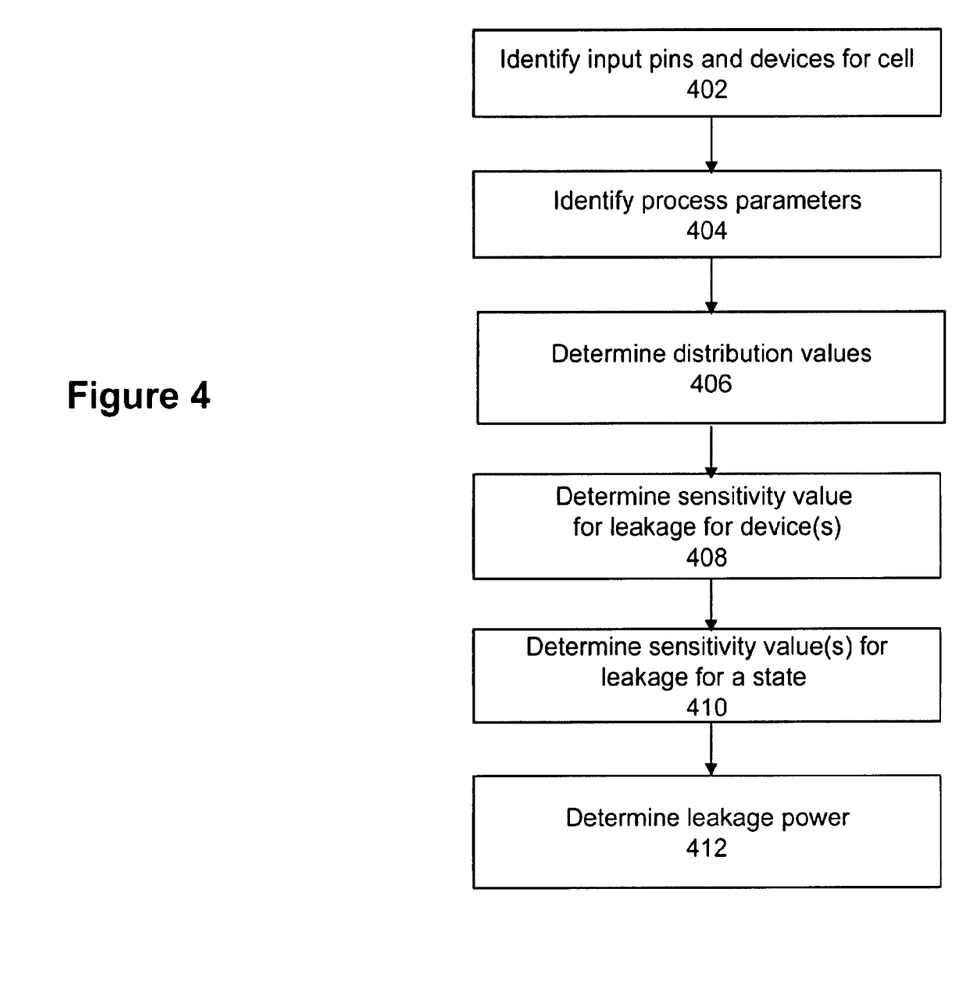
FIG. 4 illustrates a detailed flowchart of a process for analyzing/characterizing leakage power according to some embodiments of the invention.

FIG. 4 illustrates a detailed flow of a process for performing statistical leakage random variation modeling considering state correlation according to some embodiments of the invention. At 402, the process identifies the pins and devices for a given cell that is to be analyzed. If there are i input pins in the cell, then there are $2^i$ possible states $S=(C_1, C_2, \ldots, C_S)$. Assume that for a given implementation, the number of devices is calculated by totaling the number of transistors. Therefore, consider that there are M transistors in the cells represented by $(T_1, T_2, \ldots, T_M)$.

At 404, the process identifies the random process parameters to consider for the analysis. These parameters include any parameters that may change or be varied based upon processing at the foundry. Such random process parameters include, for example, Channel length (L), Channel width(W), Oxide thickness (Tox) and Threshold Voltage (Vth). The process parameters may be identified and provided by the foundry or fab. Assume that there are N random process parameters, which are represented as $(P_1, P_2, \ldots, P_N)$.

At 406, distribution values are determined for the process parameters and devices. In some embodiments that uses normal distribution values, the variation in the $n^{th}$ process parameter of $m^{th}$ transistor is represented as $P_{mn}=N(\mu_{mn}, \sigma_{mn})$, where the mu symbol represents the mean and the sigma symbol corresponds to the standard distribution.

Sensitivity values are then determined at 408 for leakage for devices in the circuit design. In the present embodiment, logarithmic sensitivity of cells leakage (in state $C_s$) to parameter $P_n$ variation in transistor $T_m$ is determined based upon the following equation:

$$S_{mn}^s = \frac{\ln[I^s(P_{mn} = \mu_{mn} + \sigma_{mn})] - \ln[I^s(P_{mn} = \mu_{mn})]}{\sigma_{mn}}$$

Next, at 410, sensitivity value(s) are determined for leakage for one or more states. As different $P_{mn}$ (where m=1, 2, ..., M and n=1, 2, ..., N) are uncorrelated, the normalized sensitivity of a cell's leakage in state $C_s$ is calculated using the square summation method, as set forth in the following equation:

$$S_{random}^s = \sqrt{\sum_{m=1}^{M}\sum_{n=1}^{N}(S_{mn}^s)^2}$$

At this point, at 412, the leakage power values are determined based upon process parameter variation effect on the leakage power. This is captured through a parameterized leakage power model that can be defined based upon the set of process parameters P1, P2, ..., PN as described above, and with consideration of $S_{random}$ that was calculated above. Leakage power can then be defined as a function of these parameters.

Since leakage power is an exponential function, the present approach models the natural logarithm of the leakage power. As such, leakage power ($P_{Leakage}$) is determined in some embodiments according to the following equation:

$\ln(P_{Leakage}) = f(P_1, P_2, \ldots, P_N)$

To model the parameter variation (e.g., $\Delta pi$ in the process parameters), a "First Order" Taylor series expansion of the form can be employed as follows:

$$\ln(P_{Leakage}) = \ln(P_{nominal}) + \sum_{i=1}^{n} S_i * \Delta pi + S_{n+1}\Delta R$$

In this equation, $S_i$ represents the sensitivity of leakage power to the $i^{th}$ parameter. $S_{n+1}$ (also referred to as $S_{random}$) is the sensitivity to random variations, which can be calculated using the approach described above. $\Delta pi$ is change in the $i^{th}$ process parameter from its nominal value. $\Delta R$ is random component of all sources of variations. $P_{nominal}$ is nominal power leakage represents when no process variation exists. The computation of $S_i$ can be performed using any conventional approach. For example, this computation can be performed using the approach described in Rao et al., "Statistical Analysis of Subthreshold Leakage Current for VLSI Circuits", IEEE TRANSACTIONS ON VERY LARGE SCALE INTEGRATION (VLSI) SYSTEMS, VOL. 12, NO. 2, February 2004.

Therefore, an approach has been described which can effectively and accurately determine leakage power. In particular, the $S_{random}$ value is used to determine the leakage power, where consideration of state correlation is explicitly employed to identify the $S_{random}$ value.

Figure 5:
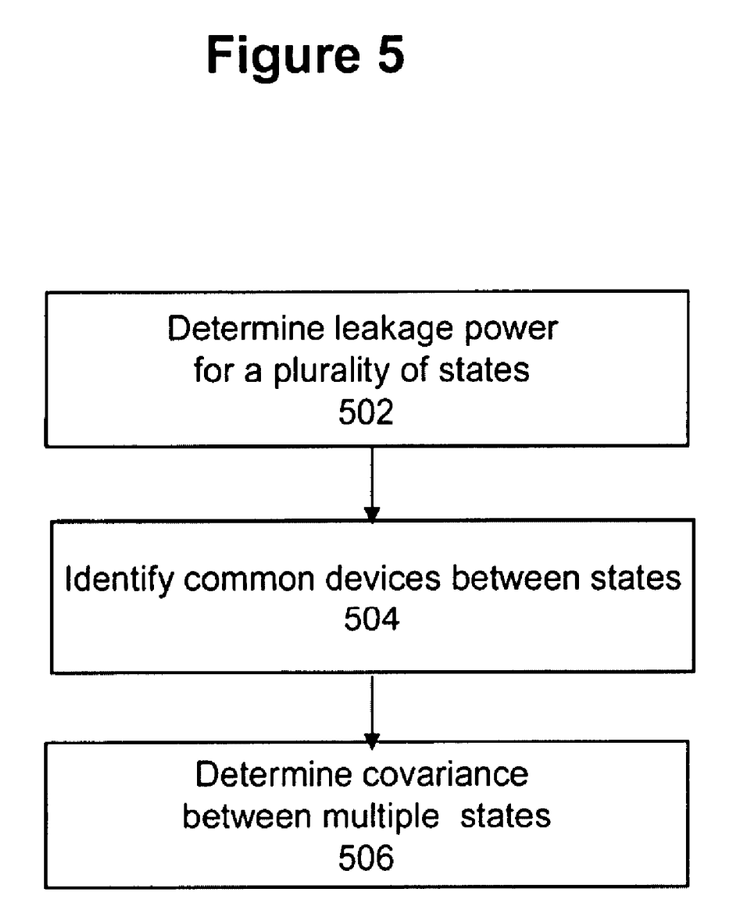
FIG. 5 illustrates a flowchart of a process for correlating between different states according to some embodiments of the invention.

Due to the use of common transistors between different states, there may be some correlation between "within the cell" variations in different states. FIG. 5 shows the flow of a process for performing this correlation according to some embodiments of the invention. In this process, at 502, the leakage power is determined for multiple states $S_1$ and $S_2$. This is accomplished based the process described above. Next, at 504, common devices m and n between the states $S_1$ and $S_2$ are identified.

At 506, covariance between two states can be found using the following equation:

$$cov(s_1, s_2) = \sum_{m=1}^{M}\sum_{n=1}^{N} S_{mn}^{s1} S_{mn}^{s2}$$

The random variation sensitivities and co-variance between states can then be captured through a co-variance matrix. For a cell with 2 inputs ($2^2$=4 states), the co-variance matrix will be of size 4×4. As the co-variance matrix would be symmetrical (cov(S1,S2)=cov(S2,S1)), only the diagonal and upper (or lower) half of the matrix are used for modeling statistical leakage random process variations.

System Architecture Overview

Figure 6:
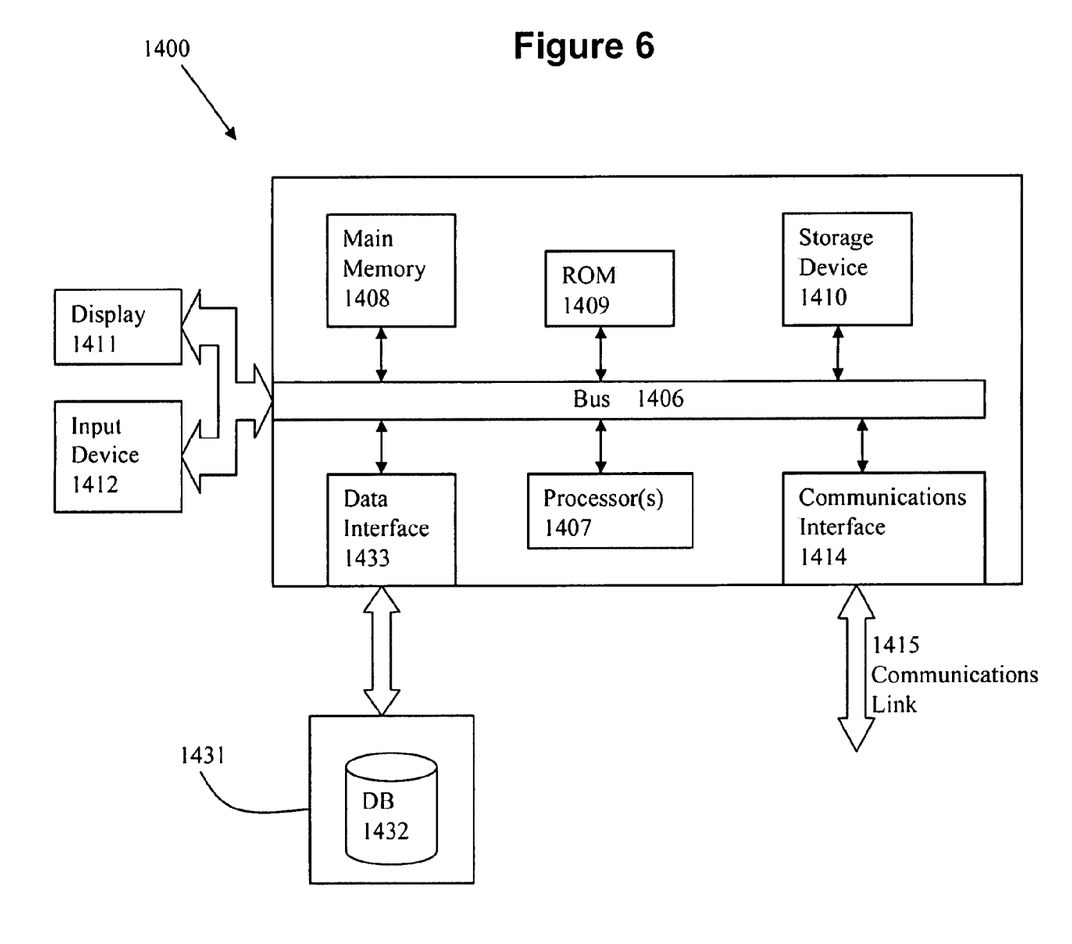
FIG. 6 shows an architecture of an example computing system with which the invention may be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH- EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method of analyzing leakage power in an electronic design, comprising:
    using at least one processor that is programmed for performing a process comprising:
    identifying an electronic design that comprises a plurality of devices to analyze; and
    analyzing the leakage power for the electronic design by at least performing an action of identifying or determining process variations for the electronic design, in which
        the process variations relate to manufacturing of the electronic design and comprise a first set of random process variation components, wherein
            the leakage power is analyzed with respect to state correlation for at least some of the plurality of devices within the electronic design, and
            the state correlation is used to characterize one or more differences between a plurality of states that affect the leakage power.

2. The computer implemented method of claim 1, in which the leakage power is analyzed based at least in part upon a leakage model corresponding to the electronic design.

3. The computer implemented method of claim 2, in which a first state for a device in the electronic design is different from a second state for the device, and the leakage model is configured to address the first and second states.

4. The computer implemented method of claim 1, in which the leakage power is analyzed by a second process comprising:
    analyzing states of inputs to cells; and
    analyzing states of sets of active devices.

5. The computer implemented method of claim 1, in which the leakage power is analyzed by a second process comprising:
    identifying inputs and devices for cells;
    identifying process parameters;
    determining distribution values;
    determining sensitivity values for leakage; and
    determining the leakage power.

6. The computer implemented method of claim 5 in which the sensitivity values are for either or both leakage for devices or leakage for states.

7. The computer implemented method of claim 5 in which the process parameters includes at least one of channel length, channel width, oxide thickness, or threshold voltage.

8. The computer implemented method of claim 1 in which correlation is performed for within-cell variations in different states.

9. The computer implemented method of claim 8, the process further comprising:
    determining the leakage power for a plurality of states;
    identifying common devices between states; and
    determining covariance between multiple states.

10. The computer implemented method of claim 9, in which random variation sensitivities and co-variance between states are captured through a co-variance matrix.

11. The computer implemented method of claim 1, in which the process variations comprise the first set of random process variation components, which does not originally include state correlation among the plurality of devices, and a second set of process variation components, which include the state correlation among at least some of the plurality of devices.

12. The computer implemented method of claim 1, the action of identifying or determining the process variations comprises:
    determining the first set of random process variation components by employing the state correlation, which is not originally included in the first set of random process variation components among the plurality of devices, to determine a set of values for the first set of random process variation components.

13. A system for analyzing leakage power in an electronic design, comprising:
    a memory for holding executable code comprising instructions to analyze the leakage power for an electronic design that comprises a plurality of devices; and
    at least one processor communicable with the memory for executing the executable code, the executable code comprising instructions which, when executed, cause the at least one processor to analyze the leakage power for the electronic design by at least performing an action of identifying or determining process variations for the electronic design, in which
        the process variations relate to manufacturing of the electronic design and comprise a first set of random process variation components, wherein
            the leakage power is analyzed with respect to state correlation for at least some of the plurality of devices within the electronic design, and
            the state correlation is used to characterize one or more differences between a plurality of states that affect the leakage power.

14. The system of claim 13 in which the leakage library comprises one or more leakage models.

15. The system of claim 14, in which the one or more leakage models characterize behavior to represent effects of process variations on leakage.

16. The system of claim 14, in which the one or more models represent effects of process variations on leakage in terms of sensitivities.

17. The system of claim 14, in which the one or more leakage models represent correlation of leakage power between two or more states.

18. The system of claim 13, in which the leakage power is analyzed using means for analyzing states of inputs to cells and means for analyzing states of sets of active devices.

19. The system of claim 13, in which the executable code comprising instructions, for identifying inputs and devices for cells, identifying process parameters, determining distribution values, determining sensitivity values for leakage, and determining the leakage power.

20. The system of claim 19, in which the sensitivity values are for either or both leakage for devices or leakage for states.

21. The system of claim 19, in which the process parameters include at least one of channel length, channel width, oxide thickness, or threshold voltage.

22. The system of claim 13, in which correlation is performed for within-cell variations in different states.

23. The system of claim 13, in which the process variations comprise the first set of random process variation components, which does not originally include state correlation among the plurality of devices, and a second set of process variation components, which include the state correlation among at least some of the plurality of devices.

24. The system of claim 13, the at least one processor is further to determine the first set of random process variation components by employing the state correlation, which is not originally included in the first set of random process variation components among the plurality of devices, to determine a set of values for the first set of random process variation components.

25. A computer program product that includes a non-transitory computer readable storage medium, the non-transitory computer readable storage medium comprising a plurality of computer instructions which, when executed by at least one processor, cause the at least one processor to perform a process for analyzing leakage power in an electronic design, the process comprising:
identifying an electronic design that comprises a plurality of devices to analyze; and
analyzing the leakage power for the electronic design by at least performing an action of identifying or determining process variations for the electronic design, in which
the process variations relate to manufacturing of the electronic design and comprise a first set of random process variation components, wherein
the leakage power is analyzed with respect to state correlation for at least some of the plurality of devices within the electronic design, and
the state correlation is used to characterize one or more differences between a plurality of states that affect the leakage power.

26. The computer program product of claim 25, in which the leakage power is analyzed based at least in part upon a leakage model corresponding to the electronic design.

27. The computer program product of claim 26, in which a first state for a device in the electronic design is different from a second state for the device, and the leakage model is configured to address the first and second states.

28. The computer program product of claim 25, in which leakage power is analyzed by using a second process comprising:
analyzing states of inputs to cells; and
analyzing states of sets of active devices.

29. The computer program product of claim 25, in which the leakage power is analyzed by a second process comprising:
identifying inputs and devices for cells;
identifying process parameters;
determining distribution values;
determining sensitivity values for leakage; and
determining the leakage power.

30. The computer program product of claim 29, in which the sensitivity values are for either or both leakage for devices or leakage for states.

31. The computer program product of claim 29, in which the process parameters includes at least one of channel length, channel width, oxide thickness, or threshold voltage.

32. The computer program product of claim 25, in which the state correlation is performed for within-cell variations in different states.

33. The computer program product of claim 32, the process further comprising:
determining the leakage power for a plurality of states;
identifying common devices between states; and
determining covariance between multiple states.

34. The computer program product of claim 33, in which random variation sensitivities and co-variance between states are captured through a co-variance matrix.

35. The computer program product of claim 25, in which the process variations comprise the first set of random process variation components, which does not originally include state correlation among the plurality of devices, and a second set of process variation components, which include the state correlation among at least some of the plurality of devices.

36. The computer program product of claim 25, the action of identifying or determining the process variations comprises:
determining the first set of random process variation components by employing the state correlation, which is not originally included in the first set of random process variation components among the plurality of devices, to determine a set of values for the first set of random process variation components.

* * * * *